May 12, 1931. W. GRUS, JR 1,805,242
LEAF SPRING OILER
Filed July 2, 1926
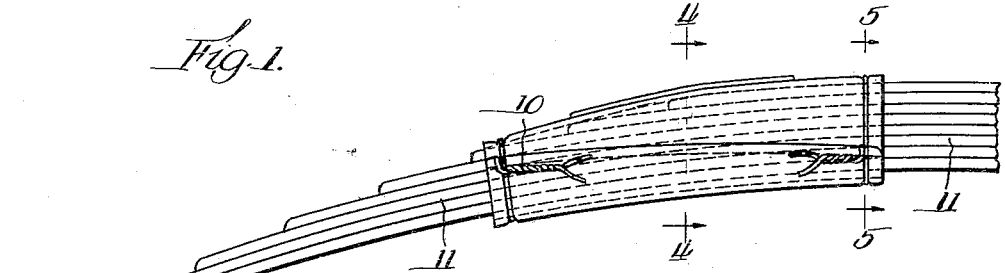
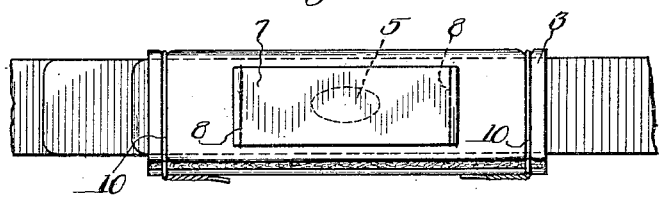
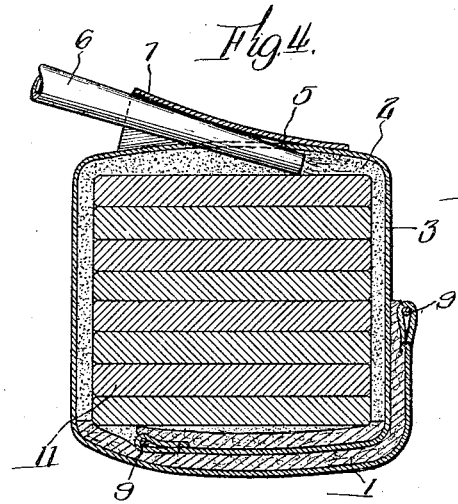
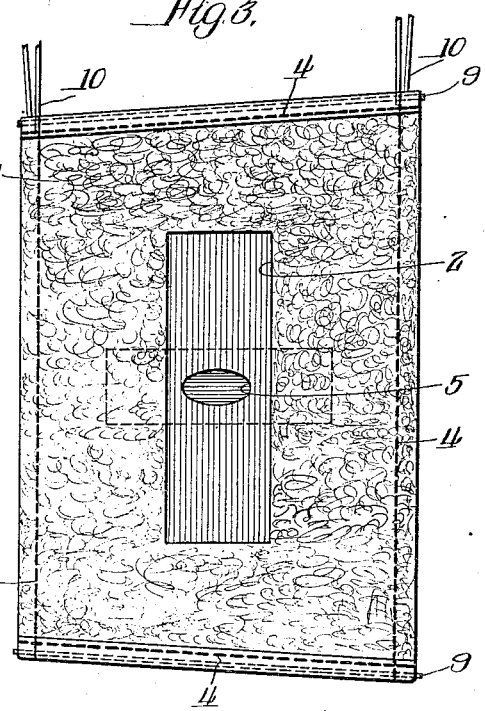
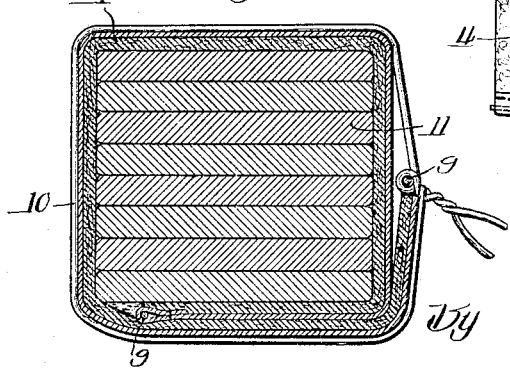
Inventor
William Grus Jr.
By Kent W. Wonnell
atty Patented May 12, 1931

1,805,242

UNITED STATES PATENT OFFICE

WILLIAM GRUS, JR., OF LOS ANGELES, CALIFORNIA

LEAF SPRING OILER

Application filed July 2, 1926. Serial No. 120,059.

This invention relates to an oiler for leaf spring, particularly of the multi-leaf type commonly used in motor vehicles, trucks for wagons or railways, and the principal object of the device is to provide means for applying a body of lubricant to a portion of the edges of such leaf springs so that the movement of the leaves will draw the oil therebetween, keeping the springs lubricated and thereby making them more easy riding, preventing them from rusting and breaking. Other objects of the invention are to provide an oiler of this type which is applicable to springs of various sizes; to provide means for attaching the oiler to springs of various sizes at the ends only of the device; to provide an inexpensive flexible cover under which an oil can tip may be inserted for filling the lubricant chamber and reservoir, and in general to provide the construction herein shown and described.

In the accompanying drawings:

Figure 1 is a side elevation of a leaf spring with an oiler constructed in accordance with the principles of this invention applied thereto;

Figure 2 is a plan view of the oiler;

Figure 3 is a plan or unfolded view of an oiler;

Figure 4 is a section taken on the line 4—4 of Figure 1; and

Figure 5 is a section taken on the line 5—5 of Figure 1.

One of the difficulties of leaf spring oiler application has been in the number of different sizes of the leaf spring. This is particularly true in the case of oilers having metal side plates or constructed of sheet metal. It was necessary to have a separate size for each different spring or to provide an adjustable oiler, the former of which is impractical from a selling standpoint on account of so many sizes and the latter from a standpoint of expense in manufacture, making the oiler too costly.

The present invention overcomes all of these difficulties by providing a pad with a flexible impervious cover, the pad having a recess to form an oil reservoir extending from the top of a leaf spring and downwardly over a portion of the edges of the leaves, and because of its flexibility being applicable to springs of entirely different dimensions without any change or variation or in the mode of application of the device itself.

Referring now more particularly to the drawings, the oiler comprises an inner pad 1 of felt, leather or other suitable material in which an opening 2 is cut or formed, the preferred material being of felt-like construction, which will absorb and hold in saturation a lubricant but which opposes a too free flow of the lubricant therethrough. To this pad 1, a non-absorbent impervious flexible cover 3 is applied by stitching 4 along the edges, or other suitable fastening means, this cover preferably consisting of oil cloth or the like with or without an inner folded lining. In this outer cover 3 is an aperture 5 which communicates with the opening 2 in the felt pad 1 to provide a filling opening for the insertion of a tip 6 of an oil can or small funnel or the like, as shown in Figure 4.

In order to cover the filling aperture 5, a strip 7 of the same material as the outer cover 3, or any other suitable material is attached to the outer cover, as by stitching 8 and extends closely over the aperture 5, forming a cover therefor which prevents dirt from getting into the oil chamber of the oiler and provides a flexible self-closing flap for the insertion of an oil can tip, as before explained.

In order to hold this flexible oiler in distended position, the ends are formed with folds or hems in which rods or stiff wires 9 are inserted. Applied to one of the ends of the oiler device and at each side thereof, is a tie member 10 preferably of wire having a loop twisted about one of the end wires 9 and of flexible construction so that each wire may be passed around a leaf spring 11 over the end of the oiler device and the ends of the tie wire twisted together to hold the oiler releasably but firmly in position.

In applying an oiler of this kind, one end is adapted to overlap the other for springs of smaller sizes the same tie wires applying in either case. When the ends of the tie wires are twisted together, they are bent down flatly against the oiler device, and when properly applied, the oiler offers no substantial or objectionable obstruction and is easily passed over and cleaned in washing the car or the springs. Even the oiling aperture offers no obstruction, which is one of the main objections to certain types of spring oilers which are filled with filling cups or the like which catch and tear the sponge or clothes of a washer or are themselves torn off, either of which is objectionable, and usually results in the discarding of the device.

After the oiler is applied to a leaf spring, the oiler receptacle or oil reservoir formed by the opening 2 in the pad 1 is simply filled with oil which saturates the pad through the leaves of the spring 11 by the movement of the leaves themselves through the pad as well as direct from the reservoir, and this receptacle is filled or replenished as explained above by raising the flexible cover 7 and inserting the tip 6 of an oil can thereunder and into the opening 2 through the apertures 5.

To remove an oiler, the tie wires 10 are untwisted and the oiler unwrapped from the spring. If the oiler slips or becomes loose, the tie wires are simply tightened sufficiently to hold the oiler in the desired place.

I claim:

1. A leaf spring oiler comprising a waterproof flexible fabric cover sheet and an inner absorbent pad substantially coextensive therewith of a length to overlap when wrapped transversely about a leaf spring, the pad only having a recess extending from the top downwardly over the edges and constituting a reservoir and passages for saturating the pad and confining a body of lubricant against a portion of the edges of the leaves, the cover sheet having an oil filling aperture above the recess at the top of the pad, and a flexible cover for the aperture composed of a strip of the cover sheet material extending over the aperture and attached at its ends only at a distance from the aperture so that an oil can spout may be inserted from either side and into the aperture for filling the reservoir.

2. An overlapping wrapped leaf spring oiler in accordance with the preceding claim in which the ends are provided with flexible ties wrapped about the ends for attaching the cover sheet and pad to a spring with the said flexible cover strip at the top of the spring so that when an oil can spout is removed from either side of the strip, after filling the aperture, the flexibility of the strip and the attachment at the ends of the cover will cause the strip to maintain a close contact with the aperture preventing the entrance of dirt thereto.

WILLIAM GRUS, JR.